US010190876B2

(12) United States Patent
Myers

(10) Patent No.: US 10,190,876 B2
(45) Date of Patent: Jan. 29, 2019

(54) LEVEL INDICATOR FOR SKID STEER ATTACHMENT

(71) Applicant: Great Plains Manufacturing, Incorporated, Salina, KS (US)

(72) Inventor: Kevin L. Myers, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 216 days.

(21) Appl. No.: 14/793,155

(22) Filed: Jul. 7, 2015

(65) Prior Publication Data

US 2016/0002891 A1  Jan. 7, 2016

Related U.S. Application Data

(60) Provisional application No. 62/021,509, filed on Jul. 7, 2014.

(51) Int. Cl.
*G01C 9/00* (2006.01)
*E02F 3/96* (2006.01)
*A01B 76/00* (2006.01)
*E02F 9/26* (2006.01)

(52) U.S. Cl.
CPC ............... *G01C 9/00* (2013.01); *A01B 76/00* (2013.01); *E02F 3/96* (2013.01); *E02F 9/264* (2013.01)

(58) Field of Classification Search
CPC .................................... G01C 9/12; G01C 9/00
USPC ........................................................ 172/430
See application file for complete search history.

(56) References Cited

U.S. PATENT DOCUMENTS

| 1,623,463 | A | * | 4/1927 | Collins | G01C 9/12 33/391 |
| 1,750,962 | A | * | 3/1930 | Lichtenberg | B66C 23/90 116/299 |
| 2,045,631 | A | * | 6/1936 | Cavender | G01C 9/12 33/370 |
| 2,835,220 | A | * | 5/1958 | Rardin | B66C 23/90 116/215 |
| 3,073,280 | A | * | 1/1963 | Thiel | B66C 23/90 212/283 |
| 3,800,425 | A | * | 4/1974 | Haynie | G01C 9/12 116/215 |
| 3,883,021 | A | * | 5/1975 | Wilhelm | B66F 9/0755 116/304 |
| 3,963,131 | A | * | 6/1976 | Dimmer | B60D 1/50 180/89.12 |
| 5,413,181 | A | * | 5/1995 | Keigley | E02F 3/815 172/253 |

(Continued)

Primary Examiner — Thomas B Will
Assistant Examiner — Joel F. Mitchell
(74) Attorney, Agent, or Firm — Hovey Williams LLP

(57) ABSTRACT

A level indicator for a skid steer attachment. The level indicator comprises a reference component configured to display a plurality of references, with each of the references being associated with a particular orientation of the skid steer attachment. The level indicator additionally comprises a securement component for supporting the reference component with respect to the skid steer attachment. The level indicator further comprises an indicator mechanism rotatably connected to the reference component or to the securement component. The indicator mechanism is configured to highlight one of the references of the reference component based on an orientation of the skid steer attachment.

17 Claims, 8 Drawing Sheets

(56) References Cited

U.S. PATENT DOCUMENTS

| | | | |
|---|---|---|---|
| 6,981,331 B1 * | 1/2006 | Poe et al. ................ | G01C 9/12 33/345 |
| 7,021,393 B2 * | 4/2006 | Khairallah et al. .... | A01B 33/02 172/1 |
| 7,926,583 B2 * | 4/2011 | Newnam ................... | E02F 3/76 172/447 |

* cited by examiner

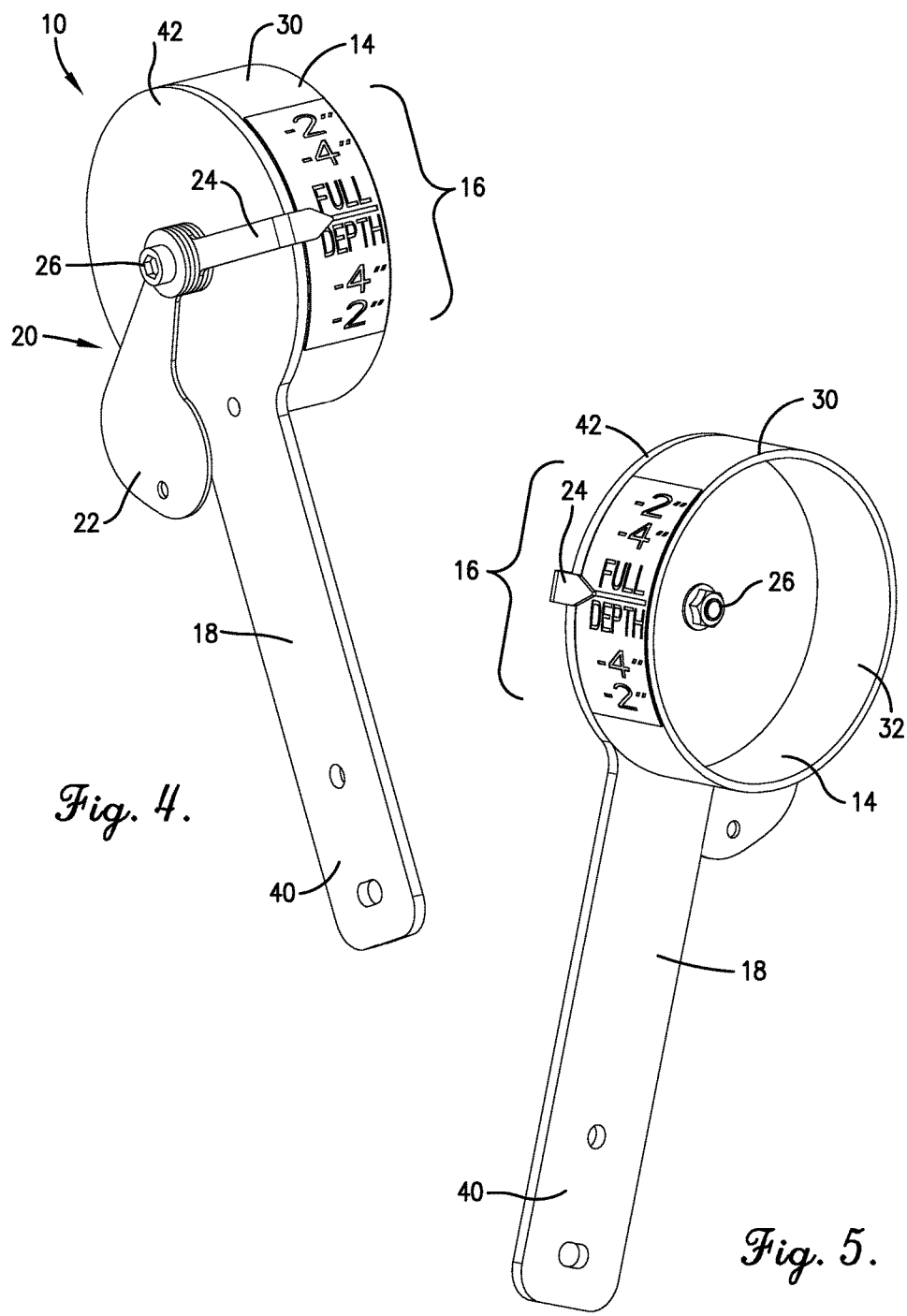

LEVEL INDICATOR FOR SKID STEER ATTACHMENT

RELATED APPLICATION

This non-provisional patent application claims priority benefit to U.S. Provisional Patent Ser. No. 62/021,509, filed on Jul. 7, 2014, and entitled "LEVEL INDICATOR FOR SKID STEER ATTACHMENT," the entire disclosure of which is herein incorporated by reference in its entirety.

FIELD

Embodiments of the present invention are directed to a level indicator for a skid steer attachment. In more detail, embodiments of the present invention are directed to an indicator operable to display a depth or an inclination angle of an attachment configured for use with a skid steer.

BACKGROUND

There are numerous types of attachments capable of being used with skid steers, such as buckets, blades, forks, tillers, or the like. During operation of a skid steer and its associated attachment, an operator is generally required to estimate a position (e.g., inclination angle or depth) of the attachment with respect to the ground. For attachments such as buckets and forks, such estimation may be performed directly by visually comparing a bottom portion of the bucket or the fork with the ground. However, for other types of attachments, the operator is unable to make such direct visual comparisons because portions of the attachments are obstructed or otherwise out of the operator's field of view. For example, with certain types of tiller and/or scarifier attachments, an operator is unable to estimate the inclination angle or the depth of the attachments with respect to the ground because portions of the attachments are below a ground level. Therefore, there exists a need for a level indicator for a skid steer attachment that provides an operator with an indication of the orientation of the attachment, such as a depth or an inclination angle of the attachment.

SUMMARY

Embodiments of the present invention include a level indicator for a skid steer attachment. The level indicator comprises a reference component configured to display a plurality of references, with each of the references being associated with a particular orientation of the skid steer attachment. The level indicator additionally comprises a securement component for supporting the reference component with respect to the skid steer attachment. The level indicator further comprises an indicator mechanism rotatably connected to the reference component or to the securement component. The indicator mechanism is configured to highlight one of the references of the reference component based on an orientation of the skid steer attachment.

Embodiments of the present invention also include a skid steer assembly comprising a skid steer attachment and a level indicator for indicating an orientation of the attachment. The level indicator includes a reference component configured to display a plurality of references, with each of the references being associated with a particular orientation of the skid steer attachment. The level indicator additionally includes a securement component for supporting the reference component with respect to the skid steer attachment. The level indicator further includes an indicator mechanism rotatably connected to the reference component or to the securement component. The indicator mechanism is configured to highlight one of the references of the reference component based on an orientation of the skid steer attachment.

Embodiments of the present invention further include a method of using a skid steer with an attachment having a level indicator, with the level indicator comprising a reference component configured to display a plurality of references and an indicator mechanism configured to highlight one of the references of the reference component based on an orientation of the skid steer attachment. The method comprising a step of positioning the skid steer attachment in a first orientation. After positioning the attachment in the first orientation, the indicator mechanism highlights a first reference of the reference component. An additional step includes positioning the skid steer attachment at a second orientation different from the first orientation. After positioning the attachment in the second orientation, the indicator mechanism highlights a second reference of the reference component, with the second reference being different from the first reference.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4 is a first side perspective view of the level indicator from FIGS. 1-3;

FIG. 5 is a second side perspective view of the level indicator from FIGS. 1-4;

FIG. 6b is a partial perspective view of the level indicator from FIG. 6a;

FIG. 7b is a partial perspective view of the level indicator from FIG. 7a.

Figure 1:
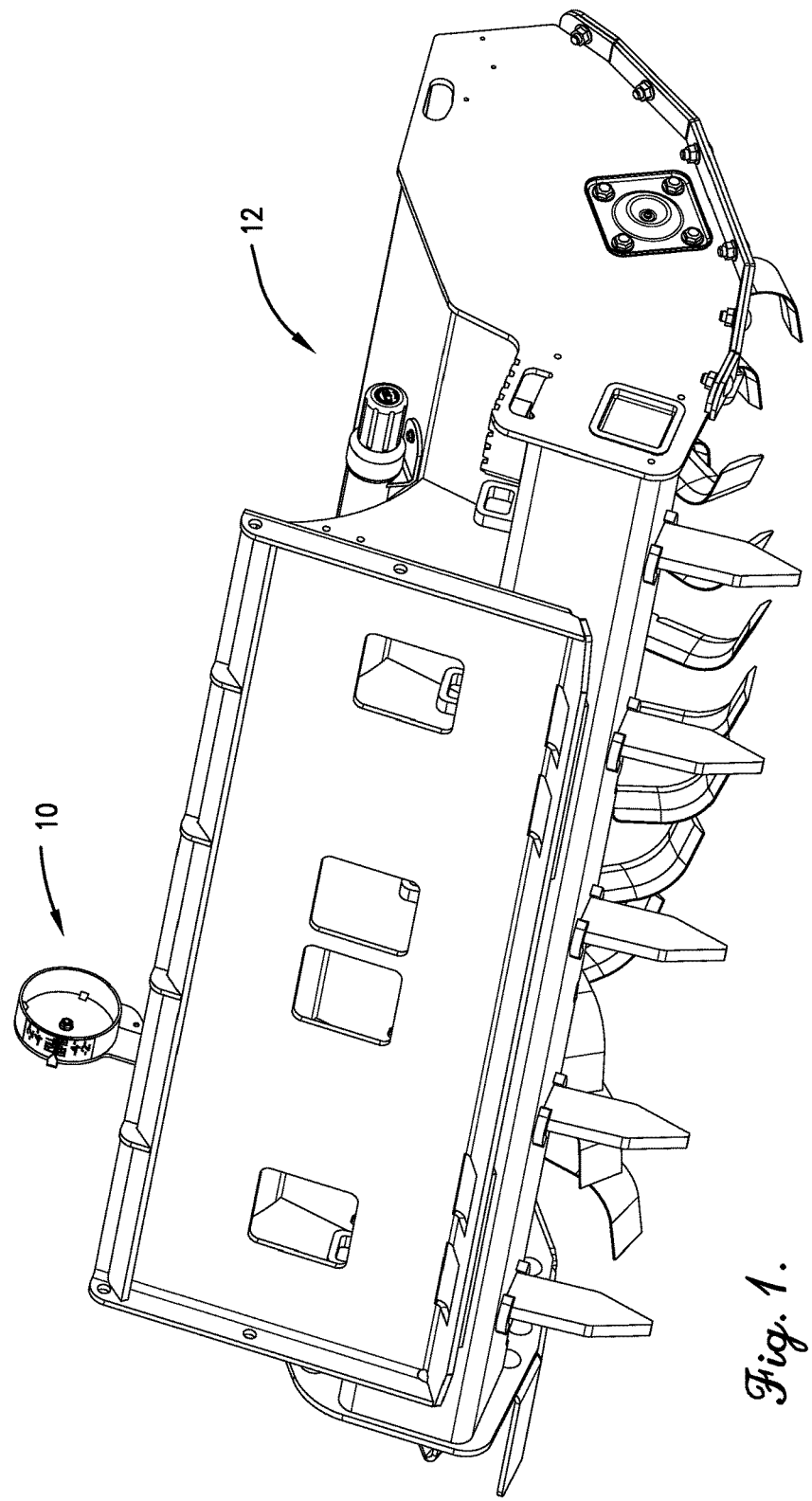
FIG. 1 is side rear perspective view of an attachment for a skid steer, with the attachment including a level indicator according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
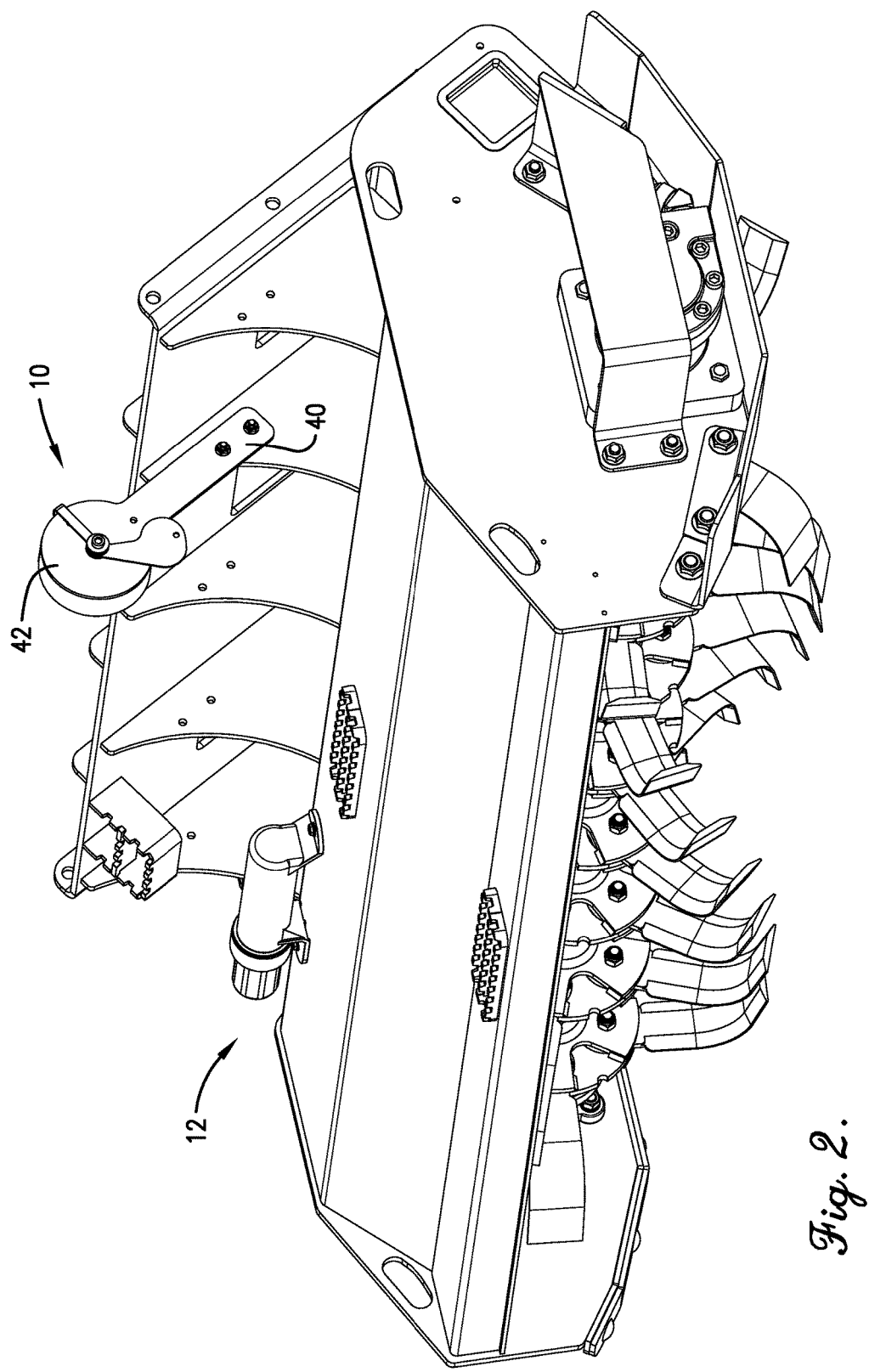
FIG. 2 is a side front perspective view of the attachment and the level indicator from FIG. 1.
Figure 3:
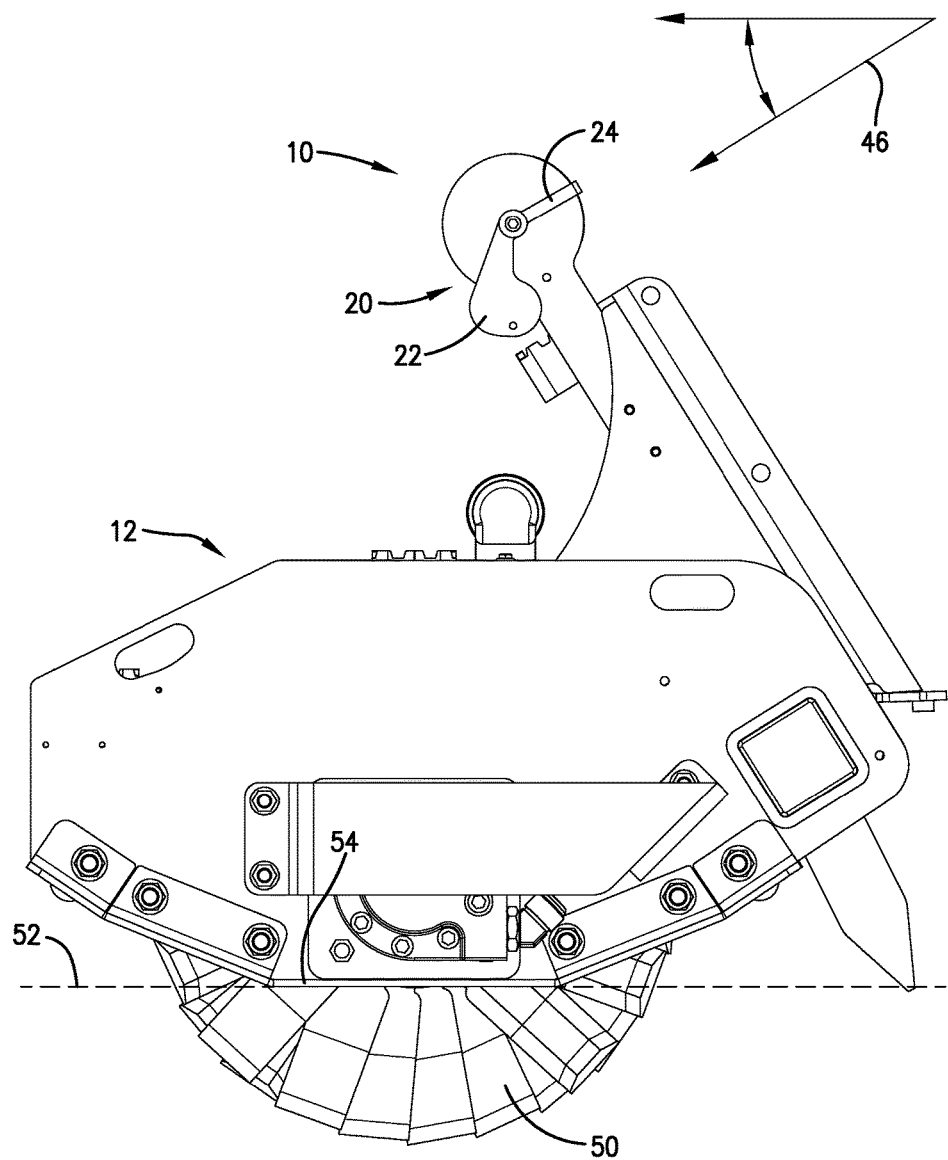
FIG. 3 is a side elevation view of the attachment and the level indicator from FIGS. 1-2.

Referring to the drawings, and particularly to FIGS. 1-3, the present invention is directed to various embodiments of a level indicator 10 for use with an attachment 12 for a skid steer (not shown). A skid steer, also known as a skid loader or a skid steer loader, is a general, small-sized heavy equipment machine with lift arms for actuating various types of attachments. Such attachments may include, for instance, tillers, buckets, blades, plows, snow-blowers, fork attachments, cutter attachments, breakers (e.g., hydraulic breakers), sweepers, and the like. The drawings illustrate an example in which the attachment 12 is a tiller and/or scarifier.

With reference to FIGS. 4-5, embodiments of the present invention include the level indicator 10, which may broadly comprise a reference component 14 configured to display a plurality of references 16, a securement component 18 for supporting the reference component 14 with respect to the skid steer attachment 12 (not shown in FIGS. 4-5), and an indicator mechanism 20 being rotatably connected to the reference component 14 or to the securement component 18. In some embodiments, the indicator mechanism 20 may include a weighted arm 22 and a pointer arm 24 extending in divergent directions from a rotation point 26. As such, the indicator mechanism 20 is configured to highlight, via the pointer arm 24, one of the references 16 of the reference component 14 based on an orientation (e.g., an angle of inclination) of the skid steer attachment 12.

The components of the level indicator 10 may be formed from various types of materials with sufficient strength and durability to perform the functions described in detail below. For example, some embodiments may provide for the components of the level indicator 10 to be formed from metal (e.g., steel, iron, aluminum, etc., or combinations thereof), polymers, composites, fiber composites, and the like, and combinations thereof. Furthermore, the components of the level indicator 10 may be formed by forming, cutting, and/or molding such components from raw material and connecting the components together by various methods of attachment, such as by use of fasteners, adhesives, welds, or the like, and combinations thereof.

Describing the level indicator 10 in more detail, the reference component 14 may, in some embodiments, such as shown in FIGS. 4-5, comprise a generally hollow cylinder with an exterior-facing radial surface 30 and an interior-facing radial surface 32. In other embodiments, the reference component 14 may be a solid cylinder. In still further embodiments, the reference component 14 may be formed in other shapes that provide an exterior surface for displaying the plurality of references 16, as will be described in more detail below.

The plurality of references 16 may be provided on the exterior-facing radial surface 30 of the reference component 14. As such, the exterior-facing radial surface 30 of the reference component 14 may be configured in the form of a dial or a gauge. The references 16 may comprise numbers, letters, words, phrases, icons, or other indications of an orientation of the skid steer attachment 12. For instance, as shown in the figures, the references 16 may comprise a combination of numbers, letters, and phrases that indicate a depth of the skid steer attachment 12 with respect to a ground level. However, in other embodiments, the references 16 may indicate an angle of inclination of the skid steer attachment 12. The references 16 may be printed or machined on the exterior radial surface of the reference component 14. In some embodiments the references 16 may be formed in colors that are different from a color of the reference component 14, such that the references 16 stand out to an operator of the skid steer. For instance, in some embodiments, the reference component 14 may be black colored, while the references 16 are white colored. However, other contrasting color combinations may be used.

The reference component 14 may be rigidly supported with respect to the skid steer attachment 12 via the securement component 18. In particular, the securement component may comprise a support bracket having a first end 40 and a second end 42. As such, and as perhaps best illustrated in FIG. 2, the securement component 18 may be is secured to the skid steer attachment 12 at its first end 40 and to the reference component 14 at its second end 42. The securement component 18 may be secured to the skid steer attachment 12 by various methods of attachment, such as by one or more nuts and bolt combinations, welding, or the like. With reference to FIGS. 4-5, the securement component 18 may be secured to the reference component 14 by various methods of attachment, such as by one or more nuts and bolt combinations, welding, or the like. In some instances, such as when the reference component 14 is cylindrical, so as to present an outer diameter, the securement component's 18 second end 42 may be circular with an outer diameter that matches, and/or concentrically matches, the outer diameter of the reference component 14. As such, the outer diameters of the securement component's 18 second end 42 and the reference component 14 may be welded together.

Because the securement component 18 is configured to rigidly connect the reference component 14 with the skid steer attachment 12, the securement component is configured to remain in a generally constant orientation with respect to the skid steer attachment 12 regardless of the orientation of the skid steer attachment 12. For instance, if the skid steer attachment 12 starts at an initial level orientation, the reference component will be orientated in a first orientation. If the skid steer attachment 12 is tilted forward by 30 degrees from the initial level orientation, then the reference component 14 will likewise be tilted forward by 30 degrees from the first orientation. As such, the reference component 14 can remain in a constant and/or consistent orientation with respect to the skid steer attachment 12.

With reference to FIGS. 4-5, the indicator mechanism 20 may be rotatably connected to the reference component 14 at the rotation point 26 (i.e., either to the securement component 18 or to the reference component 14) by a fastener, which may act as an axis about which the indicator mechanism 20 can rotate with respect to the other components of the level indicator 10. In more detail, the weighted arm 22 may be formed with a mass that is significantly greater than a mass of the pointer arm 24, such that the weighted arm 22 will generally remain gravitationally aligned and will point in a downward direction towards the ground.

The pointer arm 24 of the indicator mechanism 20 extends from the rotation point 26 at an angle with respect to the weighted arm 22. In particular, and with reference to FIG. 3, the pointer arm 24 may extend at a given angle that provides for the pointer arm 24 to be directed generally at a line of sight 46 of an operator of the skid steer. In some embodiments, the pointer arm 24 will be rigidly connected to the weighted arm 22, such that as the weighted arm remains generally gravitationally aligned, the pointer arm 24 will remain directed generally at the line of sight of the operator. Specifically, as the skid steer attachment 12 and the attached level indicator 10 are rotated by the skid steer, the weighted arm 22 will remain generally gravitationally aligned and the pointer arm 24 will remain generally directed at the line of sight of the skid steer operator. As such, the pointer arm 24 will be readily visible to the operator of the skid steer so as to highlight a particular reference 16 to provide an indication of the orientation of the skid steer attachment 12.

In some embodiments, such as shown in the figures, the pointer arm 24 may include a main portion and an end portion, with the end portion being positioned at an angle (e.g., bent) with respect to the main portion. In some embodiments, the end portion may be positioned generally perpendicularly with respect to the main portion. As such, the end portion may be configured to lie generally parallel to the exterior-facing radial surface 30 of the reference component 14. Such a configuration facilitates the ability of the pointer arm 24 to highlight one or more of the references 16 of the reference component 14. Furthermore, in some embodiments, the pointer arm 24 may be a different color than the reference component 14 and/or the plurality of references 16, such that the pointer arm 24 can readily highlight a particular reference 16 to the operator of the skid steer. For instance, embodiments may provide for the pointer arm 24 to be orange, red, yellow, white, or other easily identifiable colors.

Given the level indicator 10 described above, the indicator mechanism 20 is configured to visually highlight and/or indicate an orientation and/or a position of the skid steer attachment 12 to an operator of the skid steer. For example, for the attachment 12 illustrated in the drawings (i.e., a tiller), the level indicator 10 is operable to indicate an orientation of the attachment's 12 tines 50 (see FIG. 3) with respect to a ground level 52. In more detail, as illustrated in FIG. 3, with a central portion of a skid shoe 54 of the attachment 12 positioned parallel to and/or adjacent to the ground level 52, the tines 50 of the attachment 12 are positioned at a full depth (i.e., a maximum depth) within the ground. As such, as illustrated in FIG. 1 (also shown in FIGS. 4-5), the pointer arm 24 of the indicator mechanism 20 will highlight (e.g., point to) the reference 16 labeled "FULL DEPTH." In some embodiments, the "FULL DEPTH" reference level 16 will indicate that the tines 50 of the attachment 12 are positioned, for instance, below the ground level at a maximum distance of six inches. However, it is understood that such specific references 16 are exemplary, and embodiments of the present invention provide for the references 16 to indicate other depths and/or other inclination angles, as may be required.

Figure 6A:
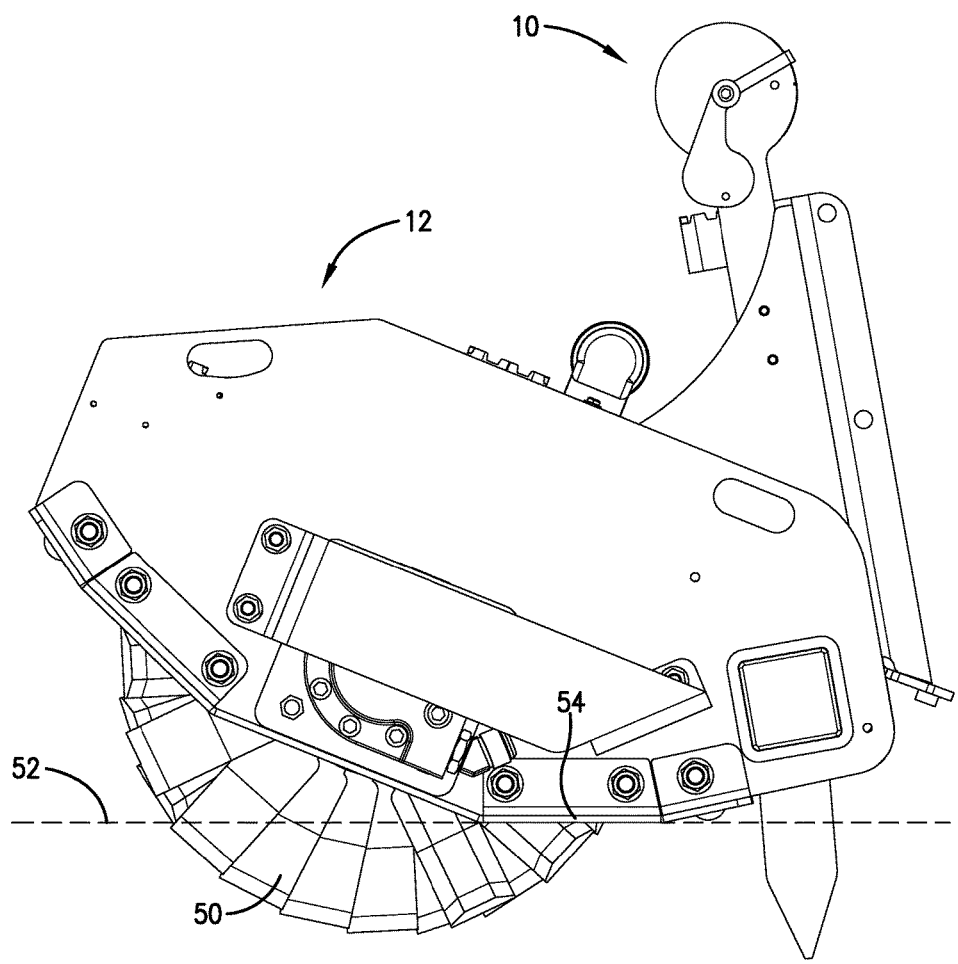
FIG. 6a is a side elevation view of the attachment and the level indicator from FIGS. 1-3, with the attachment rotated rearward.
Figure 6B:
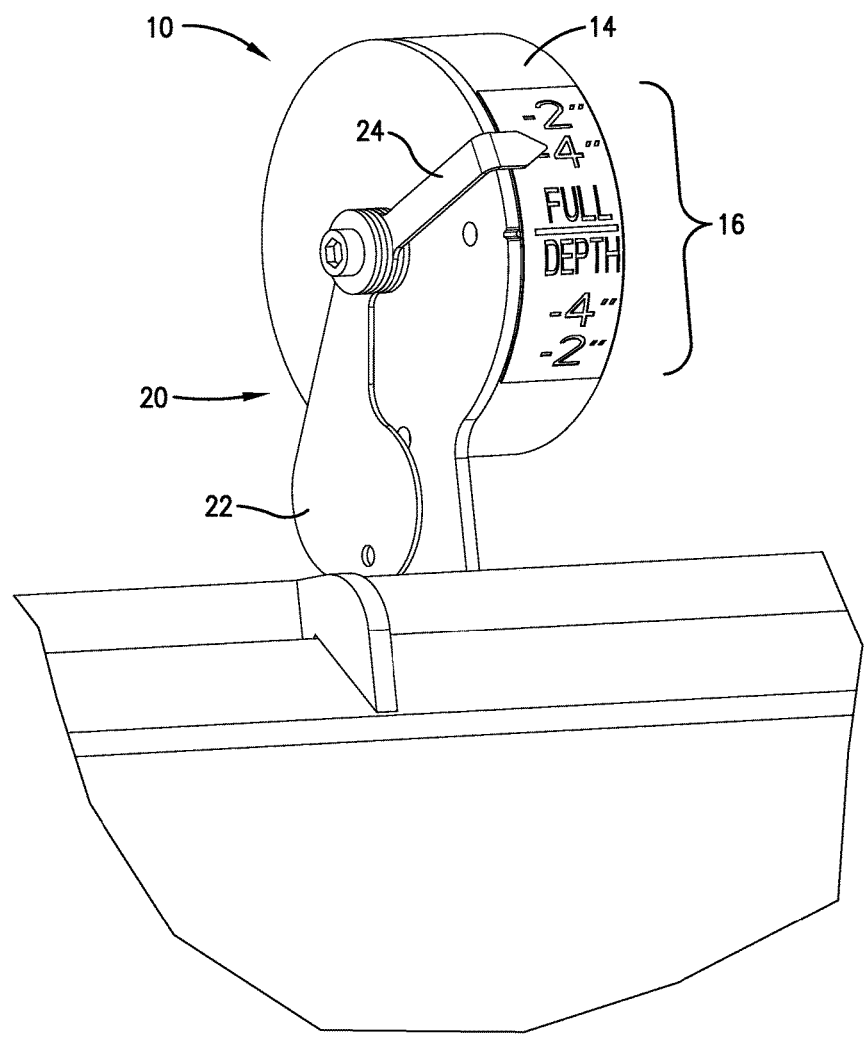

The operator can adjust the position of the skid steer attachment 12 via operator controls of the skid steer. For example, the operator can tilt/rotate the attachment 12 either forward or rearward. As illustrated by the position of the attachment 12 in FIGS. 6*a* and 6*b*, the attachment 12 can be rotated rearward, such that a rear portion of the skid shoe 54 is positioned adjacent to the ground level 52. In such a configuration, the tines 50 of the attachment 12 will be raised with respect to the "FULL DEPTH" position, such that the tines 50 are positioned below the ground level only by approximately four inches. Such a depth is indicated by the level indicator 10, as illustrated in FIG. 6*b*. In more detail, as the attachment 12 is rotated rearward, the indicator mechanism 20 will remain generally stationary (i.e., the weighted arm 22 gravitationally aligned and the pointer arm 24 directed at the line of sight of the operator), while the remaining components of the level indicator 10, such as the reference component 14 and the securement component 18, will rotate in conjunction with the attachment 12. For instance, the reference component 14 will rotate with respect to the pointer arm 24, such that the pointer arm 24 will change from highlighting (e.g., pointing to) the "FULL DEPTH" reference 16 and will, instead, highlight (e.g., point to) the "4 Inches" reference 16, which is located above the "FULL DEPTH" reference 16. Such a "4 Inches" reference 16 will correspond to the tines 50 being positioned below the ground level 52 by four inches.

In addition, the attachment 12 can be rotated additional magnitudes rearward. For instance, the attachment 12 can be rotated rearward such that the tines 50 are positioned below the ground only two inches, which may correspond to a maximum rearward rotation for the attachment 12. In such a configuration, the level indicator 10 would indicate such by the pointer arm 24 pointing to the "2 Inches" reference 16, which is located above the "FULL DEPTH" reference 16.

Figure 7A:
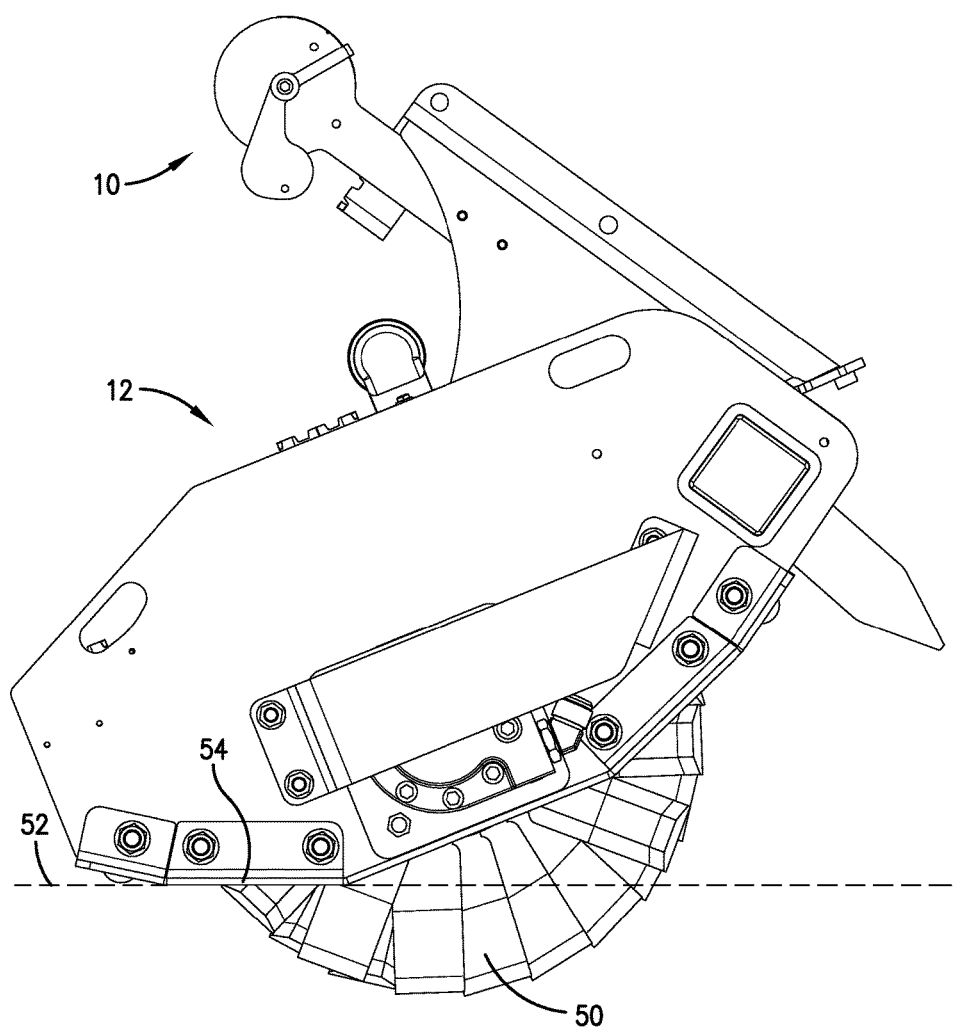
FIG. 7a is a side elevation view of the attachment and the level indicator from FIGS. 1-3 and 6a, with the attachment rotated forward.
Figure 7B:
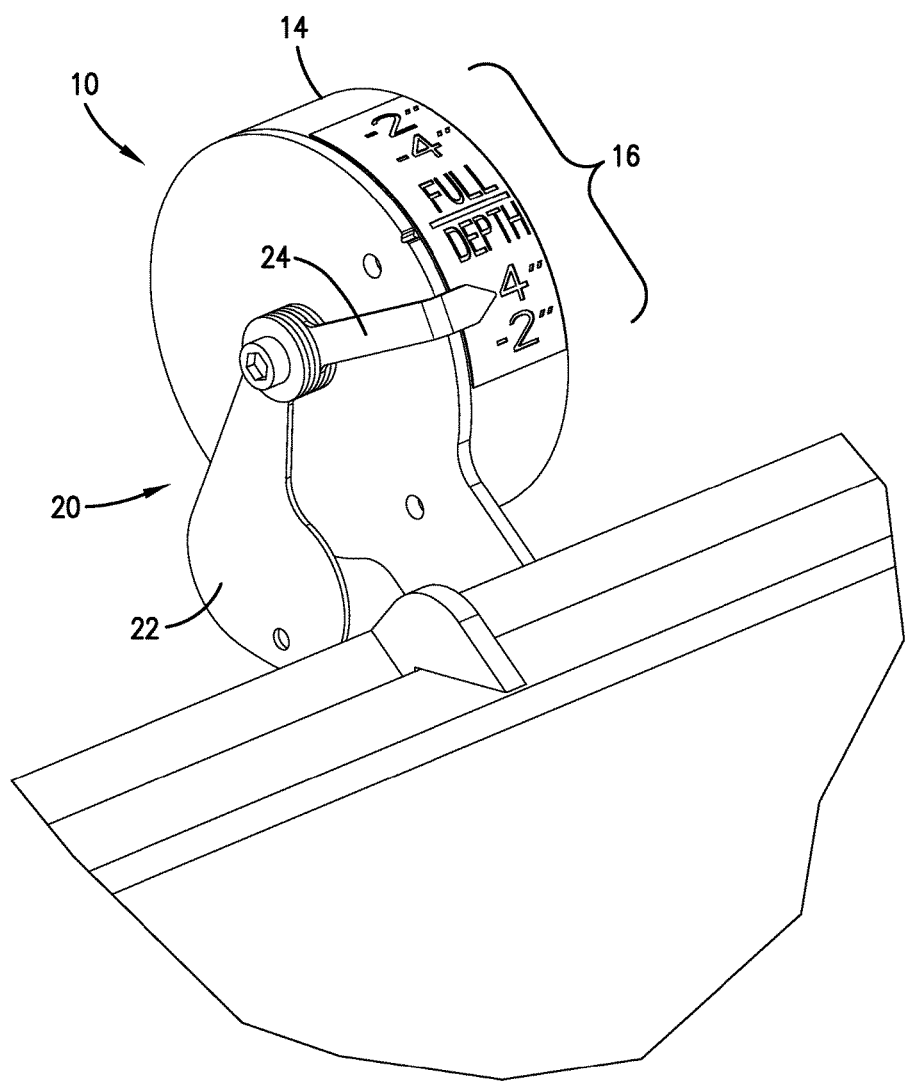

In addition to rotating rearward, the attachment 12 can be rotated forward. In such configurations, as illustrated by FIGS. 7*a* and 7*b*, the level indicator 10 is operable to indicate that the tines 50 of the attachment 12 are positioned below the ground level 52 at a particular depth. For instance, a forward rotation of the attachment 12 may cause the tines 50 to be positioned below the ground level 52 by four inches or by two inches, and such depths will be indicated by the level indicator 10 with the pointer arm 24 pointing to the "4 Inches" and the "2 Inches" references 16, respectively. As a specific example, and as illustrated in FIG. 7*a*, the attachment 12 can be rotated forward, such that a forward portion of the skid shoe 54 is positioned adjacent to the ground level 52. In such a configuration, the tines 50 of the attachment 12 will be raised with respect to the "FULL DEPTH" position, such that the tines 50 are positioned below the ground level only by approximately four inches. Such a depth is indicated by the level indicator 10, as illustrated in FIG. 7*b*. In more detail, as the attachment 12 is rotated forward, the indicator mechanism 20 will remain generally stationary (i.e., the weighted arm 22 gravitationally aligned and the pointer arm 24 directed at the line of sight of the operator), while the remaining components of the level indicator 10, such as the reference component 14 and the securement component 18, will rotate in conjunction with the attachment 12. For instance, the reference component 14 will rotate with respect to the pointer arm 24, such that the pointer arm 24 will change from highlighting (e.g., pointing to) the "FULL DEPTH" reference 16 and will, instead, highlight (e.g., point to) the "4 Inches" reference 16, which is located below the "FULL DEPTH" reference 16. Such a "4 Inches" reference 16 will correspond to the tines 50 being positioned below the ground level 52 by four inches.

As was described previously with respect to a rearward rotation of the skid steer attachment 12, during any forward rotation, the reference component 14 of the level indicator 10 will remain in a generally constant orientation with respect to the skid steer attachment 12, while the weighted arm 22 of the indicator mechanism 20 remains gravitationally aligned and the pointer arm 24 of the indicator mechanism 20 remains directed at the line of sight of the operator. As such, the indicator mechanism 20 is configured to highlight a particular reference 16 on the reference component 14, with such particular reference 16 corresponding to the particular forward-rotated orientation of the skid steer attachment.

It should be understood that in addition to illustrating depth of the skid steer attachment 12 below a ground level, the level indicator 10 could alternatively be used to indicate an angle of inclination of the attachment 12. Such an indication may be useful, for instance, with attachments 12 such as buckets, blades, or the like. Furthermore, in addition to providing an indication of depth or angle of inclination (i.e., pitch), the level indicator 10 may also be used to provide an indication of a lateral angle (i.e., roll) of the attachment 12. In such embodiment, the level indicator 10 may be positioned perpendicularly to the level indicator 10 illustrated in the drawings. As such, when the attachment 12 is positioned at various lateral angles, the level indicator 10 would be capable of indicating the magnitude of such lateral angles.

Although the invention has been described with reference to the exemplary embodiments illustrated in the attached drawings, it is noted that equivalents may be employed and substitutions made herein without departing from the scope of the invention as recited in the claims. For instance, in some alternative embodiments, the indicator mechanism 20 may be positioned within an interior of the reference component 14 and free to rotate therein. The indicator mechanism 20 may include a plurality of references 16 thereon, and the reference component 14 may include an opening formed through a portion of its exterior-facing surface. In such embodiments, one or more of the references 16 may be aligned with the opening based on an orientation of the skid steer attachment 12. As such, the aligned reference 16 will be highlighted and displayed through the reference component 14 for viewing by the operator of the skid steer.

The invention claimed is:

1. A skid steer assembly for a skid steer, said skid steer assembly comprising:
   a scarifier attachment including—
     a frame,
     a skid shoe assembly positioned on a bottom of said frame, wherein said skid shoe assembly comprises a central portion, a rear portion extending rearward from the central portion, and a forward portion extending forward from the central portion,
     one or more ground-engaging elements configured to extend from the bottom of the frame and into the ground; and
   a depth indicator for indicating a depth of said ground-engaging elements of said tiller attachment below the ground level, wherein said depth indicator includes—
     a cylindrically-shaped reference component displaying a plurality of references, wherein each of said references is associated with a particular depth below the ground level of said ground-engaging elements of said scarifier attachment;
     an elongated securement component for supporting said reference component with respect to the scarifier attachment, wherein said securement component comprises a first end and a second end, wherein said first end of said securement component is configured to be secured to the scarifier attachment, and wherein said second end of said securement component is configured to be spaced above the scarifier attachment and is secured to said reference component, wherein said second end of said securement component is circularly-shaped with a diameter that matches a diameter of said reference component; and
     an indicator mechanism rotatably connected to said securement component adjacent said second end of said securement component, wherein said indicator mechanism is configured to highlight one of said references of said reference component based on depth below the ground level of said ground-engaging elements of said scarifier attachment.

2. The skid steer assembly of claim 1, wherein references are formed on an exterior radial surface of said reference component.

3. The skid steer assembly of claim 1, wherein said plurality of references includes indications of the attachment being orientated at a full depth and at one or more partial depths with respect to the ground level.

4. The skid steer assembly of claim 1, wherein said plurality of references further indicate an angle of inclination of the scarifier attachment.

5. The skid steer assembly of claim 1, wherein said securement component rigidly secures said reference component to the scarifier attachment, such that said reference component is configured to maintain a constant orientation with respect to the scarifier attachment.

6. The skid steer assembly of claim 1, wherein said indicator mechanism is rotatably connected at a rotation point, with such rotation point configured to act as an axis about which said indicator mechanism rotates.

7. The skid steer assembly of claim 1, wherein said indicator mechanism comprises a pointer arm and a weighted arm, wherein said weighted arm has a greater mass than said pointer arm, such that said weighted arm is generally gravitationally aligned, and wherein a portion of said pointer arm extends at an angle from said weighted arm in direction generally towards a line of sight of an operator of the skid steer.

8. The skid steer assembly of claim 7, wherein as the scarifier attachment rotates to different orientations, said weighted arm is configured to remain generally gravitationally aligned and said pointer arm is configured to remain directed generally towards the line of sight of an operator of the skid steer.

9. The skid steer assembly of claim 7 wherein said pointer arm includes a main portion and an end portion, and wherein said end portion is positioned at an angle with respect to said main portion.

10. The skid steer assembly of claim 9, wherein said end portion is positioned at an angle such that it lies generally parallel to an exterior radial surface of said reference component.

11. A skid steer assembly for a skid steer, said skid steer assembly comprising:
   a tiller attachment comprising—
     a frame,
     a skid shoe assembly positioned on a bottom of said frame, wherein said skid shoe assembly comprises a central portion, a rear portion extending rearward from the central portion, and a forward portion extending forward from the central portion,
one or more ground-engaging elements configured to extend from the bottom of the frame and into the ground; and
a depth indicator for indicating a depth of said ground-engaging elements of said attachment below the ground, wherein said depth indicator includes—
a reference component displaying a plurality of references, wherein each of said references is associated with a particular depth below the ground level of said ground-engaging elements of said tiller attachment,
an elongated securement component for supporting said reference component with respect to said tiller attachment, wherein said securement component comprises a first end and a second end, wherein said first end of said securement component is configured to be secured to said tiller attachment, and wherein said second end of said securement component is configured to be spaced above said tiller attachment and is secured to said reference component,
an indicator mechanism rotatably connected to said securement component adjacent said second end of said securement component, wherein said indicator mechanism is configured to highlight one of said references of said reference component based on the depth below the ground level of said ground-engaging elements of said tiller attachment.

12. The skid steer assembly of claim 11, wherein said indicator mechanism comprises a pointer arm and a weighted arm, and wherein as said tiller attachment rotates to different orientations, said weighted arm is configured to remain generally gravitationally aligned and said pointer arm remains directed generally towards a line of sight of an operator of the skid steer.

13. The skid steer assembly of claim 11, wherein said securement component rigidly secures said reference component to said tiller attachment, such that said reference component is configured to maintain a constant orientation with respect to said tiller attachment.

14. The skid steer assembly of claim 11, wherein said ground-engaging elements comprise tines.

15. A method of using a skid steer with a tiller attachment comprising a frame, a skid shoe assembly positioned on a bottom of said frame, wherein said skid shoe assembly comprises a central portion, a rear portion extending rearward from the central portion, and a forward portion extending forward from the central portion, and one or more ground-engaging elements configured to extend from the bottom of the frame and into the ground, wherein the tiller attachment further includes a depth indicator, with the depth indicator comprising a reference component configured to display a plurality of references, and an indicator mechanism configured to highlight one of the references of the reference component based on a depth within the ground of one or more ground-engaging elements of the tiller attachment, the method comprising the steps of:

(a) providing the depth indicator, with the depth indicator additionally comprising an elongated securement component for supporting the reference component with respect to the tiller attachment, wherein the securement component comprises a first end and a second end, wherein the first end of the securement component is secured to the tiller attachment, wherein the second end of the securement component is spaced above the tiller attachment and is secured to the reference component, and wherein the indicator mechanism is rotatably connected to the securement component adjacent the second end of the securement component, (b) positioning the one or more ground-engaging elements of the tiller attachment at a first depth within the ground, wherein after the positioning of step (b) the indicator mechanism highlights a first reference of the reference component; and (c) positioning the one or more ground-engaging elements of the tiller attachment at a second depth within the ground, with the second depth being different from the first depth, wherein after the positioning of step (c) the indicator mechanism highlights a second reference of the reference component, with the second reference being different from the first reference.

16. The method of claim 15, wherein during said positioning of steps (b) and (c), the reference component remains in a constant orientation with respect to the tiller attachment.

17. The method of claim 15, wherein during said positioning of steps (b) and (c), at least a portion of the indicator mechanism remains gravitationally aligned.

* * * * *